US010828739B2

(12) United States Patent
Ziegltrum et al.

(10) Patent No.: US 10,828,739 B2
(45) Date of Patent: Nov. 10, 2020

(54) TOOL HOLDER WITH INTEGRATED SENSOR SYSTEM

(71) Applicant: HAIMER GMBH, Igenhausen (DE)

(72) Inventors: Franz Ziegltrum, Freising (DE);
Kim-Carolin Landfried, Darmstadt (DE); Ferdinand Keil, Darmstadt (DE);
Klaus Hofmann, Darmstadt (DE);
Thomas Grosch, Darmstadt (DE);
Eberhard Abele, Bühl (DE)

(73) Assignee: Haimer GmbH, Igenhausen (DE)

( * ) Notice: Subject to any disclaimer, the term of this patent is extended or adjusted under 35 U.S.C. 154(b) by 9 days.

(21) Appl. No.: 15/770,090

(22) PCT Filed: Oct. 21, 2016

(86) PCT No.: PCT/EP2016/075458
§ 371 (c)(1),
(2) Date: Apr. 20, 2018

(87) PCT Pub. No.: WO2017/068158
PCT Pub. Date: Apr. 27, 2017

(65) Prior Publication Data
US 2018/0311779 A1    Nov. 1, 2018

(30) Foreign Application Priority Data

Oct. 21, 2015 (DE) .......................... 10 2015 220 533

(51) Int. Cl.
*B23Q 17/00* (2006.01)
*B23Q 17/09* (2006.01)
(Continued)

(52) U.S. Cl.
CPC .......... *B23Q 17/0952* (2013.01); *B23B 31/02* (2013.01); *B23Q 11/1023* (2013.01);
(Continued)

(58) Field of Classification Search
CPC ............ B23Q 17/0952; B23Q 11/1023; B23Q 17/0985; B23B 31/02; B23B 2260/128;
B23B 2270/48
See application file for complete search history.

(56) References Cited

U.S. PATENT DOCUMENTS 4,890,306 A    12/1989   Noda
6,424,821 B1 *   7/2002   Komai ................... B23Q 11/00
                                                                                  455/66.1
(Continued)

FOREIGN PATENT DOCUMENTS

CN      101272877      9/2008
CN      201108970      9/2008
(Continued)

OTHER PUBLICATIONS

International Search Report issued in PCT/EP2016/075458.
(Continued)

*Primary Examiner* — Sunil K Singh
*Assistant Examiner* — Paul M Janeski
(74) *Attorney, Agent, or Firm* — Prince Lobel Tye LLP

(57) ABSTRACT

The invention relates to a tool holder (10) which is embodied for rotation around a tool holder rotation axis (D) and which comprises at its one axial longitudinal end (10*a*) a tool segment (14) for receiving a tool, and at its other axial longitudinal end (10*b*) a coupling segment (16) for torque-transferring coupling to a machine tool (78), a measurement apparatus (28) for sensing data relating to the operation of the tool holder (10) being provided on the tool holder (10), which apparatus encompasses at least the following components:—at least one sensor (30, 32, 34, 36) supplying a sensed signal;—a signal transfer apparatus (38) for transferring a measured signal;—an electrical circuit (40) connected in signal-transferring fashion to the sensor (30, 32, 34, 36) and to the signal transfer apparatus (38); and—an
(Continued)

energy supply apparatus (42) that is connected to the signal transfer apparatus (38) and to the electrical circuit (40). According to the present invention the tool holder (10) comprises a tool holder main body (12) that comprises both the tool segment (14) and the coupling segment (16), at least one component from among the sensor (30, 32, 34, 36), electrical circuit (40), and energy supply apparatus (42) being received in a recess (56, 62) in the interior of the tool holder main body (12).

30 Claims, 9 Drawing Sheets

(51) Int. Cl.
*B23B 31/02* (2006.01)
*B23Q 11/10* (2006.01)

(52) U.S. Cl.
CPC .... *B23Q 17/0985* (2013.01); *B23B 2260/128* (2013.01); *B23B 2270/48* (2013.01)

(56) References Cited

U.S. PATENT DOCUMENTS

| | | | |
|---|---|---|---|
| 7,710,287 B2 * | 5/2010 | Lange | B23Q 1/0009 340/680 |
| 8,821,085 B2 | 9/2014 | Haimer et al. | |
| 9,533,393 B2 | 1/2017 | Haimer | |
| 2007/0059117 A1 | 3/2007 | Haimer et al. | |
| 2008/0030355 A1 | 2/2008 | Lange et al. | |
| 2009/0033043 A1 | 2/2009 | Haimer et al. | |
| 2009/0234490 A1 | 9/2009 | Suprock et al. | |
| 2009/0235763 A1 | 9/2009 | Eckstein et al. | |
| 2010/0242696 A1 | 9/2010 | Gigemes et al. | |
| 2015/0050097 A1 | 2/2015 | Haimer | |

FOREIGN PATENT DOCUMENTS

| | | |
|---|---|---|
| CN | 102015203 | 4/2011 |
| CN | 102 430 960 | 4/2014 |
| CN | 104368850 | 2/2015 |
| DE | 90 14 037 | 2/1991 |
| DE | 100 29 953 | 1/2002 |
| DE | 10 2006 030834 | 1/2008 |
| EP | 1 025 952 | 8/2000 |
| EP | 2 103 379 | 9/2009 |
| JP | H03 111117 | 5/1991 |
| JP | H06 114688 | 4/1994 |
| WO | 2005/063437 | 7/2005 |

OTHER PUBLICATIONS

Ziegltrum, et al., "Smart Tool = Intelligente Werkzeuge für die vernetzte Fertigung von morgen", Fachkilliquium Produktionsautomatisierung Spanender Prozesse, Feb. 10, 2015.
Jahresbericht 2014, Institute für Produktionsmanagement, Technologie und Werkzeugmaschinen.
Search Report issued in DE 10 2015 220 533.9.

* cited by examiner

TOOL HOLDER WITH INTEGRATED SENSOR SYSTEM

CROSS REFERENCE TO RELATED APPLICATIONS

This application is the National Stage of International Application No. PCT/EP2016/075458, filed on Oct. 21, 2016, which claims priority to German Application No. 10 2015 220 533.9, filed on Oct. 21, 2015. The contents of both applications are hereby incorporated by reference in their entirety.

The present invention relates to a tool holder which is embodied for rotation around a tool holder rotation axis defining an axial direction, and which comprises at its one axial longitudinal end a tool segment having a tool receiving configuration for receiving a tool, and at its other axial longitudinal end a coupling segment having a coupling configuration for torque-transferring coupling to a machine spindle of a machine tool, a measurement apparatus for sensing data relating to the operation of the tool holder being provided on the tool holder, which apparatus encompasses at least the following components:
   at least one sensor supplying a sensed signal;
   a signal transfer apparatus for transferring a measured signal from the measurement apparatus to a receiving apparatus embodied separately from the tool holder and arranged remotely from it;
   an electrical circuit, connected in signal-transferring fashion to the sensor and to the signal transfer apparatus, for applying control to the sensor and/or for processing the sensed signal of the sensor and/or for applying control to the signal transfer apparatus; and
   an energy supply apparatus that is connected in energy-transferring fashion to the signal transfer apparatus and to the electrical circuit.

A tool holder of the species is known from EP 2 103 379 A1 and from US 2009/0235763 A1 parallel thereto. These documents disclose an extensometric sensor, provided in a measurement hub, for ascertaining a force acting in machining-related fashion on the tool holder. The measurement hub is insertable as an adapter piece or intermediate piece into the tool holder, referred to therein as a "clamping chuck." The forces occurring at the machining location are inferred from the extension values ascertained using the measurement hub.

A further tool holder of the species is known from DE 90 14 037 U1. The tool holder, referred to therein as a "tapping or drilling chuck," encompasses substantially a chuck shank having a steep taper and a gripper channel embodied in one piece thereon, as well as a multi-part measurement apparatus housing, connected detachably to the chuck shank, in which batteries, foil extensometers, diodes that transmit and receive in the infrared region and constitute a signal transfer apparatus, and at least one electric switch, are received. A chuck body having a tool receiving configuration axially adjoins—again in detachably attached fashion—the measurement apparatus housing receiving the measurement technology. Like the one recited previously, this apparatus as well serves exclusively to ascertain extension values at the measurement apparatus housing so as to infer, from the ascertained extension values, the machining forces that occur at the cutting edges of the respective tools during machining.

The connecting configurations for connecting the chuck shank and measurement apparatus housing on the one hand, and the measurement apparatus housing and chuck body on the other hand, are of identical construction according to the teaching of DE 90 14 037 U1, so that a tool holder functionally identical in terms of material removal technology and having no measurement apparatus housing can be constituted by connecting the chuck body directly to the chuck shaft, omitting the measurement apparatus housing.

The two aforesaid tool holders of the existing art equipped with a measurement apparatus are disadvantageous in terms of their multi-part construction, since joining points always mean a degradation in component rigidity which, in tool holders, creates the risk of decreased machining accuracy of the tool held with the tool holder in its tool receiving configuration.

In addition, the respective tool holder is axially lengthened both by the known measurement hub on the first aforementioned tool holder and by the known measurement apparatus housing of the second aforementioned tool holder; this can result in a decrease in the rigidity of the respective tool holder.

What furthermore occurs with the first aforementioned tool holder of the existing art is that the measurement hub projects radially beyond the actual tool holder as it would appear without a measurement hub. The measurement hub thus constitutes a disruptive contour of the tool holder, so that the known tool holder equipped with a measurement apparatus occupies a radially different spatial volume than a tool holder functionally identical in terms of material removal technology and having no measurement apparatus; this greatly limits the usability of the tool holder.

With both tool holders of the existing art, the measurement apparatuses furthermore influence the vibrational behavior of the holders. The risk exists that the desired measured signal may be distorted by the presence of the measurement apparatus. The measurement result is therefore transferable only to a limited extent to a tool holder having no measurement apparatus.

The object of the present invention is therefore to refine a tool holder of the species in such a way that it can be equipped with a measurement apparatus for sensing data relating to the operation of the tool holder without thereby unfavorably modifying, to an appreciable extent, the rigidity and/or space requirement and/or vibrational behavior of the tool holder as compared with a tool holder having no measurement apparatus.

This object is achieved by a tool holder of the kind recited initially in which the tool holder comprises a tool holder main body that comprises the tool segment and/or the coupling segment, at least one component from among the sensor, electrical circuit, and energy supply device being received in a recess in the interior of the tool holder main body.

Because the at least one sensor and/or the electrical circuit and/or the energy supply device of the measurement apparatus is received in a recess in the interior of the tool holder main body, the spatial volume used for placement at least of those components is exactly that which is occupied in any case by the tool holder main body as an indispensable carrier of at least one functionally necessary segment from among the tool segment and coupling segment, so that the at least one component of the measurement apparatus which is received in the interior of the tool holder main body does not necessitate any change in the external contour of the tool holder as compared with a tool holder functionally identical in terms of material removal technology and having no measurement apparatus. There is therefore in particular no need, as there is in the existing art, to provide an additional measurement apparatus housing on the tool holder main body, which housing axially and/or at least locally radially enlarges the tool holder as compared with a tool holder functionally identical in terms of material removal technology and having no measurement apparatus. Any disruptive contour resulting from the provision of a measurement apparatus can therefore be omitted from the tool holder according to the present invention.

"In the interior of the tool holder main body" is to be understood to mean that the measurement apparatus is integrated into the already existing main body with no need for additional attachments or structures. This is already apparent from the term "main body." Fastening of the measurement apparatus directly onto the circumferential surfaces is also expressly to be prevented.

The tool segment can be embodied both as a receptacle for direct clamping of a tool, and as a docking point for modules of a modularly constructed tool holder. The tool segment can be embodied for the use of any desired tool chucking method, for example shrink chucking, hydraulic expansion chucking, jaw chucking, threaded chucking, clamp chucking, etc.

In principle, the tool holder main body can be of multi-part configuration, such that the components of the multi-part tool holder main body preferably, during operation as intended, can be movable relative to one another but non-detachably connected to one another, as is the case e.g. with a tapping chuck. The tool holder main body then comprises not only one segment from among the tool segment and coupling segment, but both segments.

The tool holder main body is preferably embodied in one piece. The use of a one-piece tool holder main body that encompasses both the tool segment and the coupling segment allows a high level of fundamental rigidity to be furnished for the tool holder. Detachable joining points between the tool segment and the coupling segment, such as those that are necessary for the tool holders of the existing art in accordance with the species, are consequently absent from the tool holder according to the present invention.

This design furthermore allows a tool holder according to the present invention, having a measurement apparatus, to be used generically for further tool holders that are functionally identical in terms of material removal technology but have no measurement apparatus. Measurement results that are obtained with a tool holder according to the present invention can thus readily be transferred to other tool holders that are identical in terms of material removal technology and have no measurement apparatus. It is therefore not necessary to outfit all the tool holders of a machine tool, or of a group of machine tools, with a measurement apparatus.

In accordance with the present Application, a tool holder according to the present invention having a measurement apparatus is intended to be regarded as identical in terms of material removal technology to another tool holder having no measurement apparatus if said holders' constituents are identical, not considering the measurement apparatus, to the constituents of the other tool holder.

Advantageously, as many components as possible of the measurement apparatus are arranged in the interior of the tool holder main body, in order to take up as little installation space as possible in addition to the spatial volume occupied in any case by the tool holder or tool holder main body. The signal transfer apparatus as a rule will constitute an exception to this, at least if the tool holder main body is manufactured from metal as is predominantly usual at present. Metal constitutes an almost impenetrable barrier to electromagnetic waves, including light, so that as a matter of functional necessity, the signal transfer apparatus will be arranged outside the spatial volume occupied by the tool holder main body. The signal transfer apparatus, or at least an externally exposed transmitting or transmitting/receiving segment thereof, can nevertheless be received in a recess of the tool holder main body so that once again the tool holder according to the present invention has the same external contour as a tool holder functionally identical in terms of material removal technology and having no measurement apparatus, which, lacking a signal transfer apparatus, does not comprise the corresponding recess.

In the case of nonmetallic tool holder main bodies, however, e.g. made of carbon, the signal transfer apparatus can also be arranged in the interior of the tool holder main body insofar as the material of the tool holder main body is transparent to the physical operating principle used for signal transfer by the signal transfer apparatus.

The measured signal transferred from the signal transfer apparatus can be the sensed signal of the at least one sensor, or can be a signal that is processed by the electrical circuit and is thus modified with respect to the sensed signal supplied directly by the at least one sensor.

It is thus advantageously possible in accordance with the present invention to obtain a tool holder, having a measurement apparatus, which has the same external contour, when viewed orthogonally to the tool holder rotation axis in at least two different viewing directions that are rotated 90° with respect to one another around the tool holder rotation axis, as a tool holder functionally identical in terms of material removal technology and having no measurement apparatus. This takes into account the signal transfer apparatus, which can be arranged between the viewing directions rotated 90° with respect to one another. Preferably the tool holder according to the present invention has, in three different viewing directions of which two adjacent viewing directions are respectively rotated 120° with respect to one another around the tool holder rotation axis, the same external contour as a tool holder functionally identical in terms of material removal technology and having no measurement apparatus. With a sufficiently small signal transfer apparatus that can be introduced into a depression on the outer side of the tool holder, the tool holder according to the present invention can, particularly preferably, have the same external contour, in any viewing direction orthogonal to the tool holder rotation axis, as a tool holder functionally identical in terms of material removal technology and having no measurement apparatus. Disruptive contours are thus at least reduced, but preferably entirely avoided, by the embodiment according to the present invention of the tool holder having a measurement apparatus. This aspect, too, achieves the object recited previously on which the present Application is based.

In the present description of the tool holder according to the present invention and its advantageous refinements, the tool holder rotation axis constitutes the basis of a cylindrical polar coordinate system in which the tool holder rotation axis defines an axial direction, orthogonal directions that proceed from which are radial directions, circumferential directions around the rotation axis being those directions, in a plane orthogonal to the rotation axis, which orthogonally intersect the radial directions at a constant radial distance from the rotation axis.

The electrical circuit can easily and conveniently be received in at least one axial recess of the tool holder main body. This at least one axial recess can be embodied, for example, as a pocket-like recess that can be delimited in a radial direction and at an axial longitudinal end, for example exclusively, by material of the tool holder main body.

The axial recess preferably extends in a circumferential direction around the tool holder rotation axis in order to minimize an imbalance, caused by the provision of the recess of the tool holder, upon rotation around the tool holder rotation axis. At least one side wall radially externally delimiting the at least one axial recess is therefore preferably embodied cylindrically or conically, with the tool holder rotation axis respectively constituting a cylinder axis or cone axis. The imbalance can be further decreased or avoided if the at least one axial recess extends completely around the tool holder rotation axis.

In many cases a recess is already present on tool holders in the region of the tool holder rotation axis, either to receive a tool in the tool receiving configuration or for passage of a coolant through the tool holder to the machining location, or for another task. In this case the at least one recess for receiving the electrical circuit can be embodied as an annular recess, in which case not only the radially externally delimiting side wall, but also the radially internally delimiting side wall, is preferably embodied cylindrically or conically, with the tool holder rotation axis respectively constituting a cylinder axis or cone axis.

The electrical circuit can be constituted by several components, at least two of which can be received in separate axial recesses. The tool holder main body can have for that purpose at least two axial recesses, in each of which a component of the electrical circuit is received.

It is preferred in principle that the electrical circuit encompass at least one circuit substrate on which conductor paths and electrical components are provided. According to an alternative embodiment, the electrical circuit can encompass several rigid circuit substrates separated from one another, so that they can be accommodated in the smallest possible installation space. To avoid an undesired imbalance of the tool holder upon rotation around its rotation axis, the plurality of rigid circuit substrates are preferably arranged in the axial recess with a distribution in a circumferential direction around the tool holder rotation axis. An imbalance of the tool holder upon rotation around its rotation axis, which is a risk of using a plurality of circuit substrates, can be further reduced or even entirely avoided by the fact that the plurality of circuit substrates are arranged with a distribution such that an axis of inertia of the totality of the circuit substrates substantially coincides with the tool holder rotation axis.

Alternatively or additionally, in order to ensure its ability to be accommodated in a very small installation space, the electrical circuit can encompass a flexible circuit substrate that carries conductor paths and electrical components. The flexible circuit substrate can then be arranged in the axial recess in deformed, in particular rolled, fashion around the tool holder rotation axis.

It is the case in very general terms that an imbalance brought about by arranging the measurement apparatus on the tool holder with reception of components of the measurement apparatus in the tool holder can be eliminated in a known manner by balancing out the tool holder. It is advantageous, however, to provide the measurement apparatus and its components on the tool holder in such a way that the imbalance to be eliminated is as small as possible, i.e. so that the smallest possible balance weights are sufficient to eliminate it.

It can be sufficient in principle to arrange the electrical circuit, and optionally one or more further components of the measurement apparatus, in the at least one axial recess and to immobilize them there, for example by adhesive bonding and/or encapsulation of the recess with encapsulation compound, for example encapsulation resin. That component of the measurement apparatus which is received in the at least one axial recess is then inaccessible, however, or can only be removed from the recess destructively. Conversely, the electrical circuit and/or a further component received in the axial recess can be replaced in simple fashion if the at least one axial recess is closable with a cover, delimiting a receiving space. The cover can be a threaded cover, its thread preferably being oriented so that it is acted upon in a closing direction upon impingement of the greater operation-related torque from among the acceleration torque and braking torque of the tool holder. The cover can additionally be secured against rotation, preferably by adhesive bonding.

In order to sense different physical variables that change as a result of operation, at least one sensor constituting a tool segment sensor can be arranged in the tool holder main body in the tool segment of the tool holder main body. The tool segment sensor is therefore also located in the spatial volume occupied in any case by the tool holder main body. In order to arrange the tool segment sensor as close as possible to the machining location or to the tool received in the tool holder, the tool segment sensor can be received radially between a radially internal wall of a tool receiving recess of the tool receiving configuration and a radially external outer wall of the tool holder main body. In order to protect the sensor, it can be received in the interior of the tool holder at a tool-side longitudinal end of the tool holder, with an axial spacing from an end face of the tool segment.

If there be any doubt, the tool segment on the tool holder is to be regarded as that axial segment which extends in the tool holder, proceeding from the tool-side longitudinal end of the tool holder, at least axially over the length of the tool receiving configuration. The concrete embodiment of the tool receiving function is immaterial. The tool receiving configuration can be, for example, a shrink chuck or a hydraulic expansion chuck or a cutting head receptacle, or any other tool receiving configuration.

When the tool receiving configuration is a hydraulic expansion chuck, for example, the tool segment sensor can be arranged in a wall of a pressure chamber of the hydraulic expansion chuck and can be embodied for indirect or direct sensing of the clamping pressure in the pressure chamber. It is thereby possible to check continuously, during utilization of the tool holder, whether or not a clamping pressure necessary for hydraulic clamping of a tool in the tool holder is present. Indirect sensing of the clamping pressure exists, for example, if a wall segment that is deformed by the clamping pressure is provided between the tool segment sensor and the pressure chamber, and if the tool segment sensor senses the deformation of the wall segment. In this case the tool segment sensor is not directly impinged upon by the clamping pressure and is not directly wetted by the fluid furnishing the clamping pressure.

Direct sensing of the clamping pressure exists, conversely, if a sensing segment of the tool segment sensor is wetted by the fluid furnishing the clamping pressure, for example forms part of that wall of the pressure chamber which is wetted by the fluid.

Clamping pressure monitoring as recited above is by no means the only sensing purpose of the tool segment sensor. Several tool segment sensors can also be provided, which either redundantly sense the same physical variable or sense different physical variables. For example, a tool segment sensor can be a temperature sensor that senses the operating temperature of the tool segment. This can be useful especially when the tool receiving configuration used is a shrink chuck, in which clamping of the tool in the tool receiving configuration is accomplished by thermal expansion and shrinkage of material of the tool holder or tool holder main body.

Alternatively or additionally, the tool segment sensor can be a deformation sensor, for example an extensometric element or a piezo sensor, so that inferences as to the machining forces occurred at the machining location can thereby be drawn indirectly by way of the deformation occurring at the tool segment. It is thereby possible inter alia, for example, to monitor a material-removing tool for wear. The tool segment sensor can furthermore, additionally or alternatively, be an acceleration sensor, for example (but not only) in order to check the tool segment for the occurrence of vibrations, which can likewise be an indication of tool wear or of incorrectly selected operating parameters in terms of tool rotation speed and/or tool advance. A pressure sensor constituting a tool segment sensor has already been discussed above using the example of the pressure chambers of the hydraulic expansion chuck. The utilization examples mentioned are intended only as highlights to give an impression of the possible applications of sensors in the tool holder, in particular (but not only) of tool segment sensors. Those skilled in the art will certainly be familiar with the operating parameters relevant to their application instance, and will be able to select the sensors necessary and suitable for monitoring them.

In addition or alternatively to the tool segment sensor described above, at least one sensor constituting a coolant sensor can be arranged in a coolant conduit for conveying a coolant and/or lubricant in the tool holder main body. Using the coolant sensor, the temperature and/or pressure of the coolant, and/or the volume of coolant flowing per unit time, can be sensed. As regards the coolant flow, the coolant sensor can also serve only for qualitative sensing of a coolant flow, i.e. for sensing whether or not coolant is flowing. The coolant sensor can be, for that purpose, a temperature sensor and/or a pressure sensor and/or a flow sensor.

In order to avoid undesired imbalances at the tool holder, the coolant sensor is preferably arranged in a central coolant conduit, i.e. preferably in a coolant conduit through which the tool holder rotation axis passes.

Additionally or alternatively, at least one sensor constituting a body sensor can be arranged in the above-described axial recess. For optimum utilization of the receiving space surrounded by the axial recess, the body sensor can be arranged on an inner wall radially internally delimiting the recess and/or on an outer wall radially externally delimiting the recess. In this case the body sensor can sense, directly at the inner and/or outer wall, for example a temperature, a deformation, and/or an acceleration, i.e. for instance vibration, and/or solid-borne sound. The body sensor can therefore preferably be a temperature sensor and/or a deformation sensor and/or an acceleration sensor.

In many cases it can be necessary to provide a plurality of identical sensors for sensing a first operating variable, either in order to sense the first operating variable as reliably as possible with redundancy so that failure of one or several sensors has no effect on sensing of the first operating variable, or in order to infer a second operating variable from the multiply sensed first operating variable. In either case it is advantageous to arrange the plurality of identical sensors with a distribution in a circumferential direction around the tool holder rotation axis, particularly preferably to arrange them equidistantly in a circumferential direction. Maximally symmetrical placement of identical sensors around the tool holder rotation axis specifically reduces or avoids the imbalance possibly resulting from sensor placement. Symmetrical placement of identical sensors around the tool holder rotation axis can also simplify indirect sensing of a second operating variable, since sensors arranged symmetrically around the tool holder rotation axis can, in certain operating situations, supply sensed signals that, at identical times, are identical in terms of magnitude and/or direction. If the sensed signals of the individual sensors relating to the first operating variable are not identical, the occurrence in principle of a second operating variable differing from zero, or even the magnitude and direction of the second operating variable, can be inferred therefrom. The measurement apparatus can encompass for that purpose a signal evaluation apparatus that is embodied to infer indirectly, by comparing the sensed signals of the plurality of sensors, a second operating variable not directly sensed by the sensors.

By using tangential acceleration sensors arranged radially and equidistantly in a circumferential direction with reference to the tool holder rotation axis it is thus possible, for example, to infer a radial acceleration of the tool holder which is otherwise detectable only with difficulty. This is because if a radial acceleration of the tool holder occurs, the sensed signals of the tangential acceleration sensors arranged equidistantly in the manner recited above are not of the same magnitude, as would be the case if a radial acceleration were not occurring. It is even possible to infer, based on the differences in the sensed signals of the individual tangential acceleration sensors, the magnitude and direction of the radial acceleration that is respectively acting.

The use of radial acceleration sensors on tool holders is problematic, since because of the high rotation speeds of the tool holder during operation, the centripetal accelerations that are acting are so high that the rated sensing range of commercially usual acceleration sensors is exceeded even with ordinary operation of the tool holder as intended.

The energy supply apparatus can be an electrical energy reservoir. The electrical energy reservoir can be provided replaceably on the tool holder in the event it becomes exhausted, and/or can be embodied rechargeably, e.g. as a rechargeable battery. The rechargeable electrical energy reservoir does not need to be removed from the tool holder in order to be recharged if it possesses a corresponding coupling mechanism for coupling to a charging source. In a simple instance this can be a socket or a plug connector. In a preferred case this can be a mechanism for inductive coupling, so that the electrical energy reservoir can also be recharged in contactless fashion.

The energy supply apparatus can therefore encompass an induction apparatus, preferably an induction coil, embodied for inductive transfer of electrical energy; the induction apparatus can be designed not only for recharging an electrical energy reservoir but for supplying the instantaneously required electrical energy with no intermediate storage thereof. A further induction apparatus, which can interact with the induction apparatus of the energy supply apparatus of the tool holder according to the present invention for inductive energy transfer, can be provided for this purpose on the machine tool on which the tool holder is used.

In order to ensure simplified accessibility for the energy supply apparatus, for example in order to replace it, provision can be made that the energy supply apparatus is received in a recess, preferably a pocket-like recess, extending axially and/or radially inward from an outer side of the tool holder main body. Because the tool holder main body is usually made of metal, in order to avoid undesired short circuits the energy supply apparatus is received in the recess extending radially inward preferably with interposition of an electrically insulating insulator configuration. The recess extending radially inward can extend exclusively in a radial direction, or can additionally also extend in a circumferential direction and/or in an axial direction. The opening of this recess is preferably located in a radially outward-facing enveloping surface of the tool holder main body.

Both terminals of the energy supply apparatus are preferably insulated with respect to the tool holder main body, so that both terminals are connected to insulated conductors that convey energy to the loads. Alternatively, however, one of the two terminals can also be in electrically conductive contact with the tool holder main body, so that the reference potential is applied to the entire tool holder main body.

The recess, extending axially and/or radially inward, for receiving the energy supply apparatus can again, like the axial recess above for receiving the electrical circuit, be embodied in stable fashion as a recess similar to a blind hole. In order to protect the energy supply apparatus, the recess extending axially and/or radially inward can be closable by a cover, delimiting a receiving volume. For easier access to the energy supply apparatus, the cover is preferably mountable detachably on the recess, for example as a threaded cover.

The measurement apparatus can furthermore be equipped with a device that delivers to the energy supply apparatus the electrical energy contained in the electrical sensed signals of sensors arranged in the tool holder, for example for the purpose of storing electrical energy in an electrical energy reservoir.

In order to ensure transfer, with as little interference as possible, of the measured signal to a receiving apparatus provided, as a rule, outside the tool holder for that purpose, the signal transfer apparatus is arranged on the outer side of the tool holder main body. The signal transfer apparatus is preferably adhesively bonded onto the outer side of the tool holder main body, since adhesive bonding on the one hand furnishes sufficient connection strength and on the other hand allows different materials to be connected.

The signal transfer apparatus can transfer measured signals in any suitable form, preferably by way of electromagnetic waves such as radio waves or even light, in particular invisible light in the infrared region. A standard that is already established is preferably used for signal transfer, for example Bluetooth®, ZigBee®, or the like.

The tool holder usually has on its outer side a gripper channel, extending in a circumferential direction around the tool holder rotation axis, which is embodied in known fashion for positive engagement with a gripper device. Because the gripper channel is delimited between two flanks located axially opposite one another, the flanking of the gripper channel can be used, for example, to provide the signal transfer apparatus on the outer side of the tool holder main body but nevertheless with a certain degree of protection from external influences. For example, the signal transfer apparatus can be arranged on a radial projection axially delimiting the gripper channel. During machining of a workpiece by a tool received in the tool holder, the radial projection is exposed but is remote from the machining location and is not influenced by it, for example by chips or by coolant splashes.

For example, the signal transfer apparatus can be received in a depression axially adjacent to the gripper channel. The signal transfer apparatus can be received, for example, in a depression of the radial projection that also serves to flank the gripper channel.

For example, the signal transfer apparatus can be arranged on the tool holder main body with mechanical protection by way of tool holder main body segments projecting beyond it in a radial direction, with no disruption to the gripper channel, if a radially projecting flange extending in a circumferential direction, which separates the depression from the gripper channel, is arranged between the gripper channel and the depression receiving the signal transfer apparatus. That axial side of the flange which faces toward the gripper channel can constitute a flank of the gripper channel.

It is understood that the signal transfer apparatus can also analogously be mounted on the cylindrical outer side of tool holders that do not possess a gripper channel.

The tool holder often comprises on its outer side two axial grooves, provided in a circumferential direction with a spacing from one another, that can serve, for example, to orient the tool holder in a circumferential direction when the tool holder is being handled by a gripper. In this case the signal transfer apparatus can be received in a circumferential direction between the axial grooves. This is preferred in particular if the two axial grooves have only a small spacing in a circumferential direction, for example no more than twice the circumferential extent of the wider of the two axial grooves.

Whereas the gripper channel extends principally in a circumferential direction, i.e. exhibits its largest dimension in a circumferential direction but nevertheless extends in both an axial and a radial direction, the aforesaid axial grooves also have an extent in a circumferential direction and a radial direction but have their largest dimension in an axial direction. The same is correspondingly true for the above-described axial recess in which the electrical circuit is preferably received.

When the tool holder comprises both a gripper channel embodied as presented above and at least one axial groove, it is preferred if the two axial grooves intersect the gripper channel. In this case the axial grooves can be embodied, without excessive material removal, at least locally on a radial projection axially delimiting the gripper channel.

The signal transfer apparatus is preferably arranged on the radial projection axially delimiting the gripper channel when it is also arranged between two axial grooves that are adjacent in a circumferential direction. As a rule, the circumferential extent of that segment of the radial projection which is located between the two axial grooves is then sufficiently small that that segment of the radial projection which is located between the two axial grooves can be embodied, without functional impairment, to be somewhat shorter radially than beyond the two axial grooves in a circumferential direction. The signal transfer apparatus is thus protected in a circumferential direction by the greater radial extent of the radial projection beyond the axial grooves.

Conductor conduits, in which corresponding conductors are routed, can be embodied in the tool holder main body for the transfer of energy and/or signals, in particular between components of the measurement apparatus. The conductor conduits can be embodied, for example, as orifices that completely surround the electrical or optical conductor extending in them. In order to avoid undesired kinks or bends in the conductors, it is advantageous if a conductor conduit for receiving a connecting conductor transferring a signal and/or energy between two components of the measurement apparatus encloses an angle with an imaginary radial line extending from the tool holder rotation axis. An advantageously low level of force exertion on the conductors in the context of rapid rotation of the tool holder around its rotation axis, as intended, can be obtained if the conductor conduit extends tangentially.

The tool holder according to the present invention can be embodied for coupling to differently embodied mating coupling apparatuses of machine spindles, in which context the coupling configuration can have any known conformations. For example, the coupling configuration can encompass a hollow shank taper or a steep taper and/or an engagement configuration for a spherical clamping system or a polygonal clamping system, and the like.

The present invention furthermore relates to an apparatus arrangement for machining workpieces, encompassing: at least one tool holder embodied as described above, a machine tool having a machine spindle that is embodied for coupling to at least one tool holder, and a receiving device that is embodied to receive the measured signals transferred from the signal transfer apparatus.

The receiving device, like the signal transfer apparatus, can be embodied as a transmitting/receiving device for bidirectional signal transfer. In the present Application it will nevertheless continue to be referred to simply as a "receiving device."

In a context of bidirectional signal transfer, the properties of the measurement apparatus can be modified, for example, by over-the-air programming. The type of measured signal processing, for example, can thereby be influenced. It is possible to select whether the measurement apparatus is to carry out a preprocessing of the signals, or to forward them directly to the receiving device. When several tool holders according to the present invention are operated at a short distance from one another, the signal transfer apparatuses and the associated receiving devices can coordinate with one another in order to avoid mutual interference. This can occur, for example, by selecting a shared transfer frequency or a recognition signal, for example an address. In order to conserve energy, the signal transfer apparatus can switch into a sleep mode when it is not needed, and can be reawakened as necessary by a signal of the receiving apparatus. In addition, the signal transfer apparatus can periodically awaken after a certain time has elapsed, or can be awakened by another signal of the electrical circuit or of the at least one sensor. It is of course also possible for the receiving device to be in contact simultaneously with several signal transfer apparatuses.

The apparatus arrangement can furthermore comprise an evaluation apparatus, connected in data-transferring fashion to the receiving device, which is embodied to process and/or evaluate the measured signals transferred from the signal transfer apparatus. According to one possible embodiment, the evaluation apparatus can be the only signal-processing apparatus of the apparatus arrangement. Alternatively or additionally, as has already been described above, sensed signals of one or several sensors in the tool holder can be processed by the electrical circuit of the measurement apparatus in the tool holder.

The machine tool advantageously encompasses a machine controller that controls drive systems of the machine tool for workpiece machining. The machine controller is preferably connected in data-transferring fashion to the evaluation apparatus and/or to the receiving device so that interventions in terms of machine operation can be performed as necessary as a function of the measured signals transferred from the signal transfer apparatus, if applicable after they are processed by the evaluation apparatus.

The apparatus arrangement can furthermore comprise a tool storage system having a tool manager, the tool manager being connected in data-transferring fashion to the receiving device and/or to the evaluation apparatus in order to operate the tool storage system, for example as a function of the measured signals transferred from the signal transfer apparatus, if applicable after they are processed by the evaluation apparatus. For example, when a tool defect is recognized or when a wear limit at a tool is reached, an equivalent replacement tool can be made ready and can be conveyed to the machine tool. The tool manager is therefore preferably also connected in data-transferring fashion to the machine controller.

The evaluation apparatus, the machine controller, and the tool manager can each be implemented by way of electronic data processing apparatuses.

The present invention will be explained in further detail below with reference to the attached schematic drawings, in which.

Figure 1:
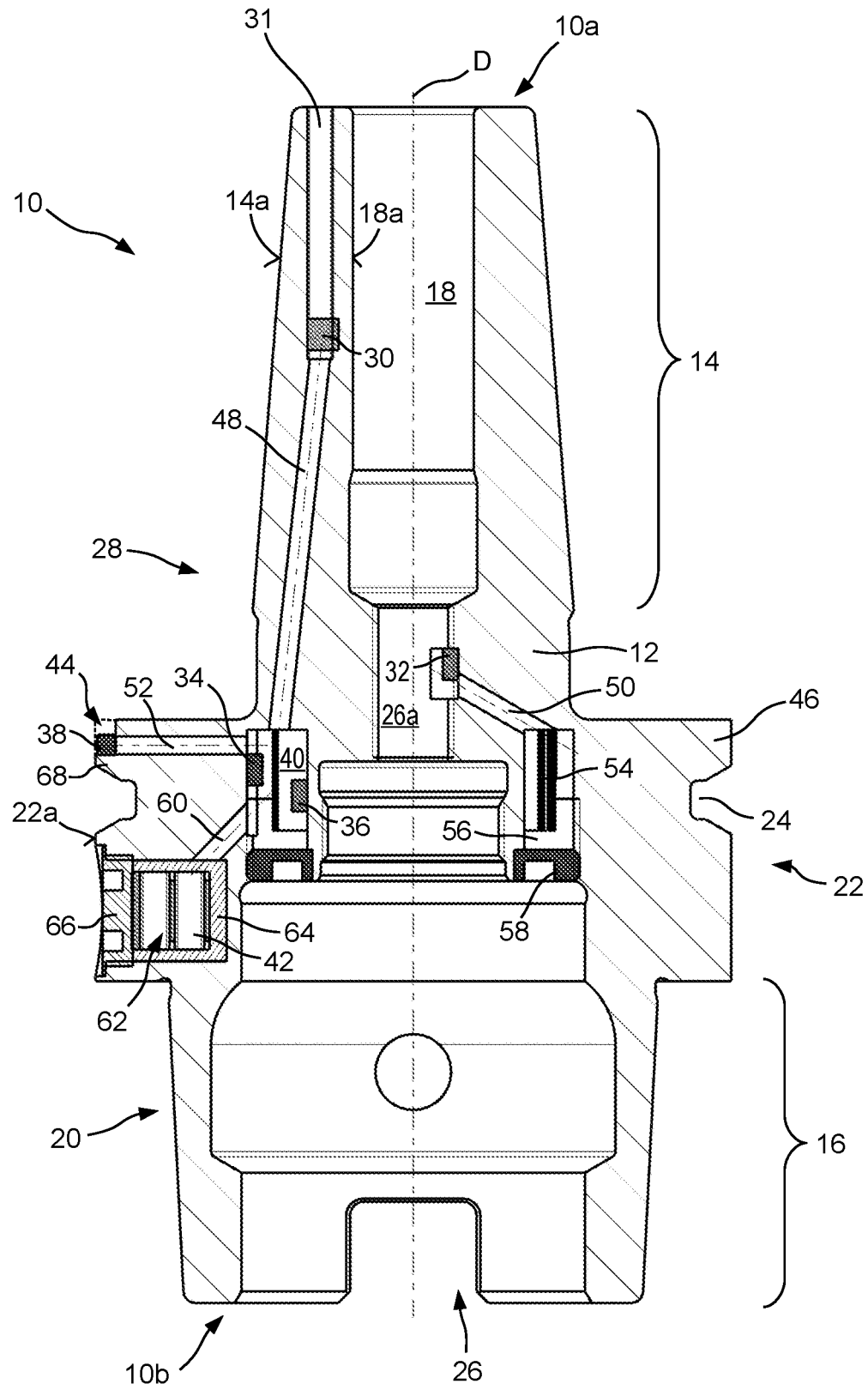
FIG. 1 is a longitudinal section view, along a section plane containing the tool holder rotation axis, through a first embodiment of a tool holder according to the present invention having a shrink chuck.

In FIG. 1, a first embodiment of a tool holder according to the present invention is labeled generally as 10. Tool holder 10 encompasses a tool holder main body 12 that is referred to hereinafter simply as main body 12. Main body 12 is embodied in one piece in order to achieve maximum rigidity. It is usually manufactured from metal. For purposes of the present Application, a component is also "in one piece" if it is generated using an additive method, for example from metal powder, or is assembled nondetachably from several components, for example by welding or soldering.

Tool holder 10, which extends along a tool holder rotation axis D hereinafter referred to simply as rotation axis D, comprises at its tool-side longitudinal end 10*a* a tool segment 14, and at its oppositely located coupling-side longitudinal end 10*b* a coupling segment 16.

Tool segment 14 encompasses a tool receiving configuration 18 in the form of a tool receiving recess. A shank of a tool (not depicted in FIG. 1) is introducible axially from tool-side longitudinal end 10a into this tool receiving recess 18. Tool segment 14 is embodied in a manner known per se as a shrink chuck, in which a shank of a tool (not depicted in FIG. 1) can be clamped utilizing the thermal expansion and shrinkage of the material of main body 12.

In the example shown in FIG. 1, coupling segment 16 encompasses a coupling configuration 20 in the form of a hollow shank taper (HSK).

As can be demonstrated by way of the further exemplifying embodiments, tool segment 14 can also be embodied in accordance with a different clamping principle. Independently thereof, coupling segment 16 can also be embodied with a different shank shape.

A handling configuration 22 for handling tool holder 10, for example using a gripper apparatus, can be provided axially between tool segment 14 and coupling segment 16. Handling configuration 22 can encompass a gripper channel 24 proceeding in a circumferential direction around rotation axis D.

In the example shown in FIG. 1, a central recess 26, of which tool receiving recess 18 constitutes an axial segment, passes axially completely through main body 12. Segment 26a of central recess 26 serves, among other purposes, for the delivery of coolant through tool holder 10 to the machining location at which the tool clamped in tool holder 10 is in machining engagement with a workpiece to be machined.

Tool holder 10 is equipped with a measurement apparatus 28 for monitoring operation of the tool holder during workpiece machining. In the example depicted, measurement apparatus 28 encompasses four sensors 30, 32, 34, and 36, a signal transfer apparatus 38, an electrical circuit 40 (indicated merely schematically), and an energy supply apparatus 42 in the form of a battery pack. When the tool holder is viewed in the viewing direction of FIG. 1 (orthogonally to rotation axis D), all these measurement apparatus components 30 to 42 are located within an external contour that would also be exhibited by a tool holder 10 of identical design having no measurement apparatus 28.

Because signal transfer apparatus 38 is exposed on an outer side of main body 12 in order to facilitate signal transfer, for example via radio waves, signal transfer apparatus 38 is received in a depression recess 44 of radial projection 46 that delimits gripper channel 24 toward tool-side longitudinal end 10a. This depression recess 44 was configured specifically for signal transfer apparatus 38. In the absence of measurement apparatus 28, radial projection 46 extending around rotation axis D in a circumferential direction would have the same contour to the left of rotation axis D in FIG. 1, in mirror-image fashion with reference to rotation axis D constituting a mirror axis, as to the right of rotation axis D in FIG. 1. Even though signal transfer apparatus 38 is exposed, it is therefore also located within the contour of a tool holder 10 of identical design having no measurement apparatus 28. The contour of tool holder 10 of identical design having no measurement apparatus 28 is indicated with dashed lines in the region of signal transfer apparatus 38.

Sensor 30 constituting a tool segment sensor is arranged in tool segment 14 radially between a wall 18a radially externally delimiting tool receiving recess 18 and an outer wall 14a of tool segment 14. In an axial direction, it is located with an offset axially inward from tool-side longitudinal end 10a of tool holder 10 into main body 12. Tool segment sensor 30 can be, for example, a temperature sensor that senses the temperature of tool segment 14 of tool holder 10 and supplies a corresponding sensed signal to electrical circuit 40. This makes it possible, for example, to monitor correct tool clamping in shrink chuck of tool segment 14.

Tool segment sensor 30 is received from tool-side longitudinal end 10a in a sensor receiving recess 31. Sensor receiving recess 31 can be embodied, for example, as an orifice and can extend parallel to rotation axis D of tool holder 10.

Electrical connecting conductors between sensors 30 to 36 and electrical circuit 40 are not depicted in the present Figures. The conductor conduits in which the electrical connecting conductors extend are, however, depicted. The electrical connecting conductor between tool segment sensor 30 and electrical circuit 40 extends in conductor conduit 48.

It is expressly noted that the conductor conduits are depicted in merely schematic fashion in the exemplifying embodiments presented here, without regard to the manufacture thereof in individual cases.

A further sensor 32 constituting a coolant sensor 32 can be provided in segment 26a, provided for the passage of coolant, of central recess 26. This coolant sensor 32 can monitor pressure and/or temperature and/or a flow quantity per unit time, and/or the presence of a coolant flow. Coolant sensor 32 is also connected in signal-transferring fashion to electrical circuit 40 by means of a connecting conductor (not depicted) in conductor conduit 50.

Signal transfer apparatus 38 is likewise connected in signal-transferring fashion to electrical circuit 40 by way of a connecting conductor (not depicted) in conductor conduit 52.

In the example depicted in FIG. 1, electrical circuit 40 is embodied on a flexible circuit substrate 54 that is rolled around rotation axis D and received in an annular axial recess 56. Electrical conductor paths and electrical functional elements are arranged on circuit substrate 54 in a manner known per se. Circuit substrate 54 can additionally be secured in position in annular axial recess 56 by adhesive bonding.

In order to protect the components of measurement apparatus 28 that are received in axial recess 56, axial recess 56 can be detachably closed off, preferably at its one axial longitudinal end, by a cover 58, for example a threaded cover 58. The components received in axial recess 56 therefore remain easily accessible and replaceable. Alternatively, after all the necessary components of measurement apparatus 28 are arranged therein, axial recess 56 can be encapsulated with an encapsulation compound. The same also applies to the conductor conduits that are embodied in tool holder 10 or in main body 12.

Axial recess 56 is preferably embodied in the manner of a blind hole and is delimited exclusively, with the exception of the conductor conduits proceeding from and opening into it, by material of main body 12 and by cover 58.

Further sensors 34 and 36 can be received in the annular axial recess 56 and connected in signal-transferring fashion to electrical circuit 40. For example, one sensor 34 can be arranged on a radially external delimiting wall, and a further sensor 36 on a radially internal delimiting wall. Sensors 34 and 36 can be, for example, acceleration sensors and/or can be deformation sensors, which sense, at their respective attachment location, an acceleration and/or a deformation of main body 12 that supports them. Vibrations and imbalances of tool holder 10, as well as forces and moments acting on tool holder 10 from the machining side, can thereby be sensed.

The sensed signals supplied from sensors 30 to 36 either can be further processed by electrical circuit 40, or can be transferred as raw data via signal transfer apparatus 38 to a receiving device, provided outside tool holder 10, of an evaluation apparatus attached thereto.

What is depicted as an energy supply in the example shown in FIG. 1 is a battery pack 42 that is coupled to electrical circuit 40 by way of an energy supply conductor (not depicted) passed through conductor conduit 60. Conductor conduits 48, 50, and 52 that have already been recited serve not only for signal transfer but also for energy transfer between signal transfer apparatus 38 and sensors 30 to 34, and electrical circuit 40 and battery pack 42.

Battery pack 42 is received in radial recess 62 extending radially inward from outer side 22a of handling configuration 22 orthogonally to rotation axis D, specifically in order to avoid short circuits between battery pack 42 and the electrically conductive main body 12 made of metal, with interposition of an insulating configuration 64 separating battery pack 42 from main body 12. Radial recess 62 can again be closed off, preferably detachably closed, for example again by way of a threaded cover 66, in order to protect battery pack 42 and secure it in position.

A flange 68 of radial projection 46, which flange separates signal transfer apparatus 38 from gripper channel 24, is present between signal transfer apparatus 38 and the axially adjacent gripper channel 24. Flange 68, like radial projection 46 as a whole, serves to flank gripper channel 24 toward tool-side longitudinal end 10a of tool holder 10. Flange 68 thus shields signal transfer apparatus 38 from external influence by a gripper during handling of tool holder 10 by the gripper. At the same time, the contour of gripper channel 24 along the periphery remains substantially undisrupted.

Figure 2:
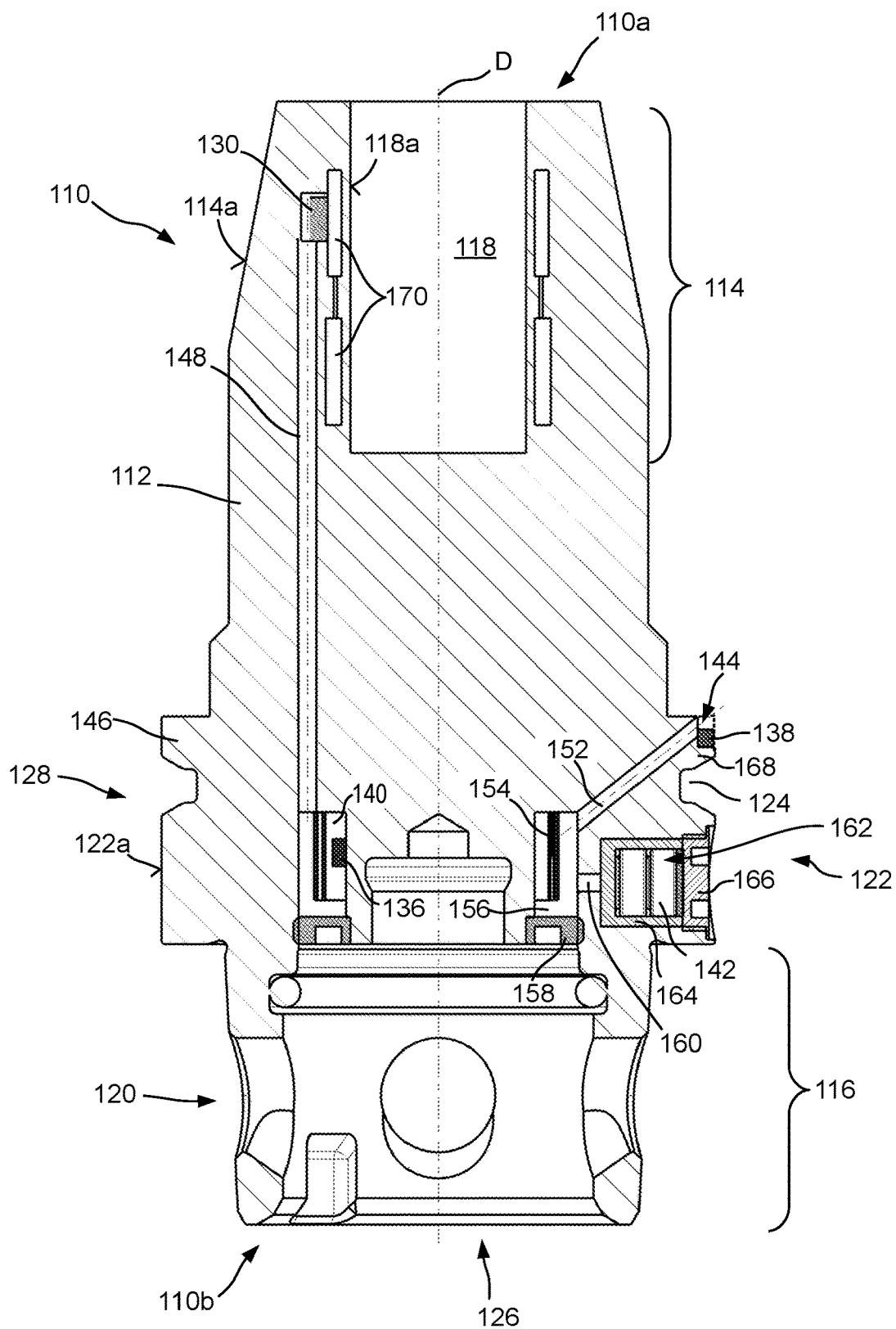
FIG. 2 is a longitudinal section view, along a section plane containing the tool holder rotation axis, through a second embodiment of a tool holder according to the present invention having a hydraulic expansion chuck.

FIG. 2 depicts a second exemplifying embodiment of a tool holder according to the present invention. Identical and functionally identical components and component segments are labeled with the same reference characters as for the first embodiment depicted in FIG. 1, but incremented by 100. The second embodiment is explained below only insofar as it differs from the first embodiment in FIG. 1, the description of which should otherwise also be referred to for an explanation of the second embodiment.

Tool holder 110 depicted in FIG. 2 comprises as tool receiving configuration 118 a hydraulic expansion chuck in which the unobstructed width of the tool receiving recess formed by tool receiving configuration 118 can be modified by admitting a hydraulic fluid into pressure chambers 170.

In the exemplifying embodiment of FIG. 2, tool segment sensor 130 is embodied as a pressure sensor that is provided in order to sense the clamping pressure in pressure chambers 170. A sensing region of tool segment sensor 130 can constitute, for that purpose, part of the wall of pressure chamber 170.

In the exemplifying embodiment shown in FIG. 2, central recess 126 does not penetrate through main body 112, although central recess 126 could also be embodied so as to penetrate through main body 112 in a longitudinal direction.

Coupling segment 116 of tool holder 110 is embodied with a configuration for a spherical clamping system.

In contrast to what is depicted merely schematically in FIG. 2, main body 112 of the second embodiment can have subdivisions. For example, wall 118a that radially externally delimits tool receiving recess 118 can be embodied on a separate insertion component that, when combined with main body 112, forms pressure chambers 170.

Figure 3:
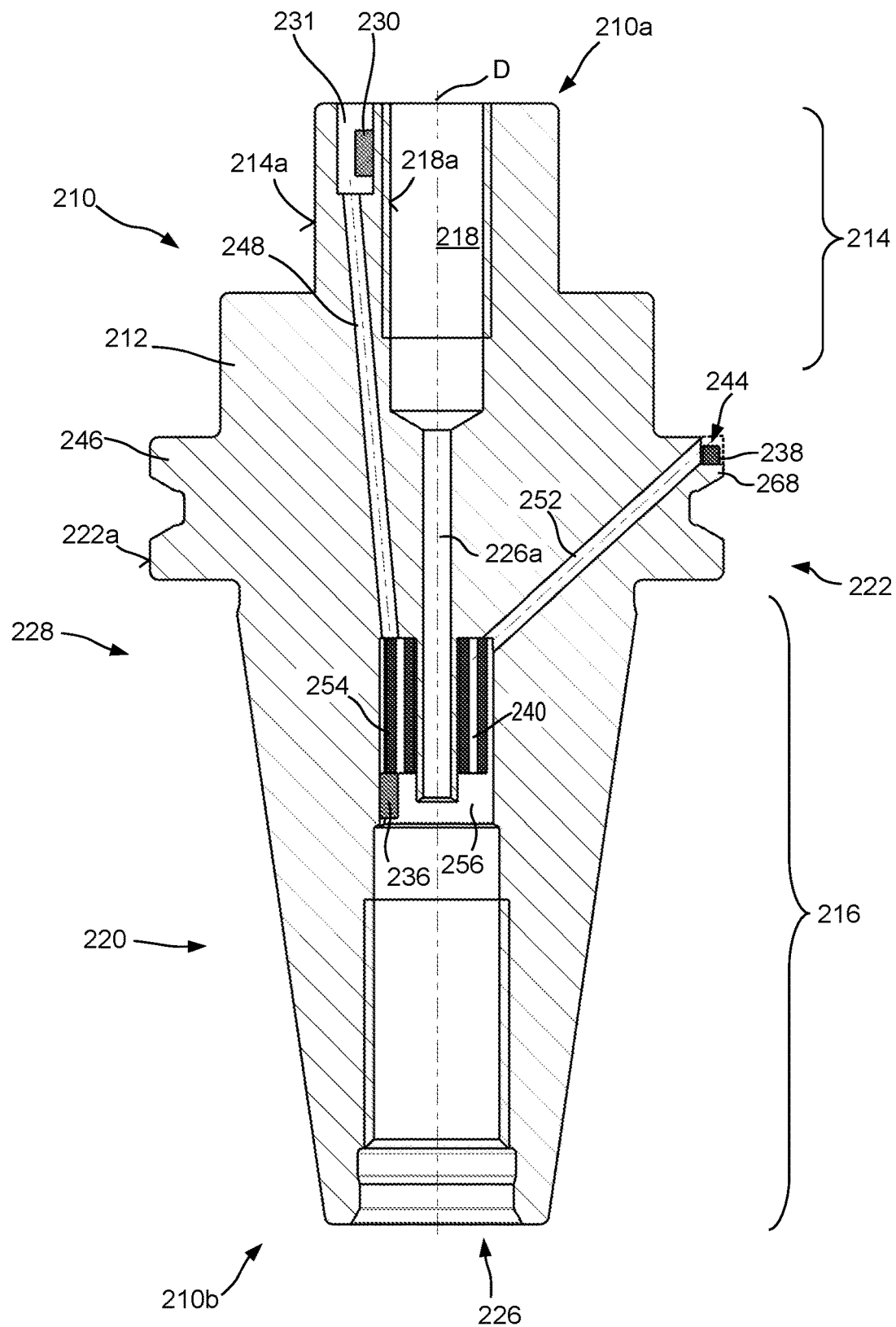
FIG. 3 is a longitudinal section view, along a section plane containing the tool holder rotation axis, through a third embodiment of a tool holder according to the present invention having a cutting head receptacle.

FIG. 3 depicts a third exemplifying embodiment of a tool holder according to the present invention. Identical and functionally identical components and component segments are labeled with the same reference characters as for the first embodiment depicted in FIG. 1, but incremented by 200. The third embodiment is explained below only insofar as it differs from the first embodiment in FIG. 1, the description of which should otherwise also be referred to for an explanation of the third embodiment.

Tool holder 210 of FIG. 3 comprises a tool segment 214 that is embodied to receive a cutting head. Tool segment 214 comprises for that purpose a tool receiving configuration 218 in the form of a tool receiving stem having a receiving recess and an internal thread.

Coupling segment 216 comprises a coupling configuration 220 in the form of a steep taper or SK.

In the exemplifying embodiment shown in FIG. 3, axial recess 256 for receiving electrical circuit 240 on flexible circuit substrate 254 is left open toward coupling-side longitudinal end 210b. A detachable cover for closing off axial recess 256 can be provided here as well, however.

Although this is not depicted in FIG. 3, tool holder 210 of FIG. 3 also comprises an energy supply apparatus. As in the embodiments shown previously, this can be a battery pack or a rechargeable battery pack. It can also encompass an induction coil for inductive transfer of electrical energy.

Tool segment sensor 230 can be, for example, an acceleration sensor, so that any vibrations of tool segment 214 of tool holder 210 can be sensed and tool wear or incorrectly selected operating parameters can be inferred therefrom.

Figure 4:
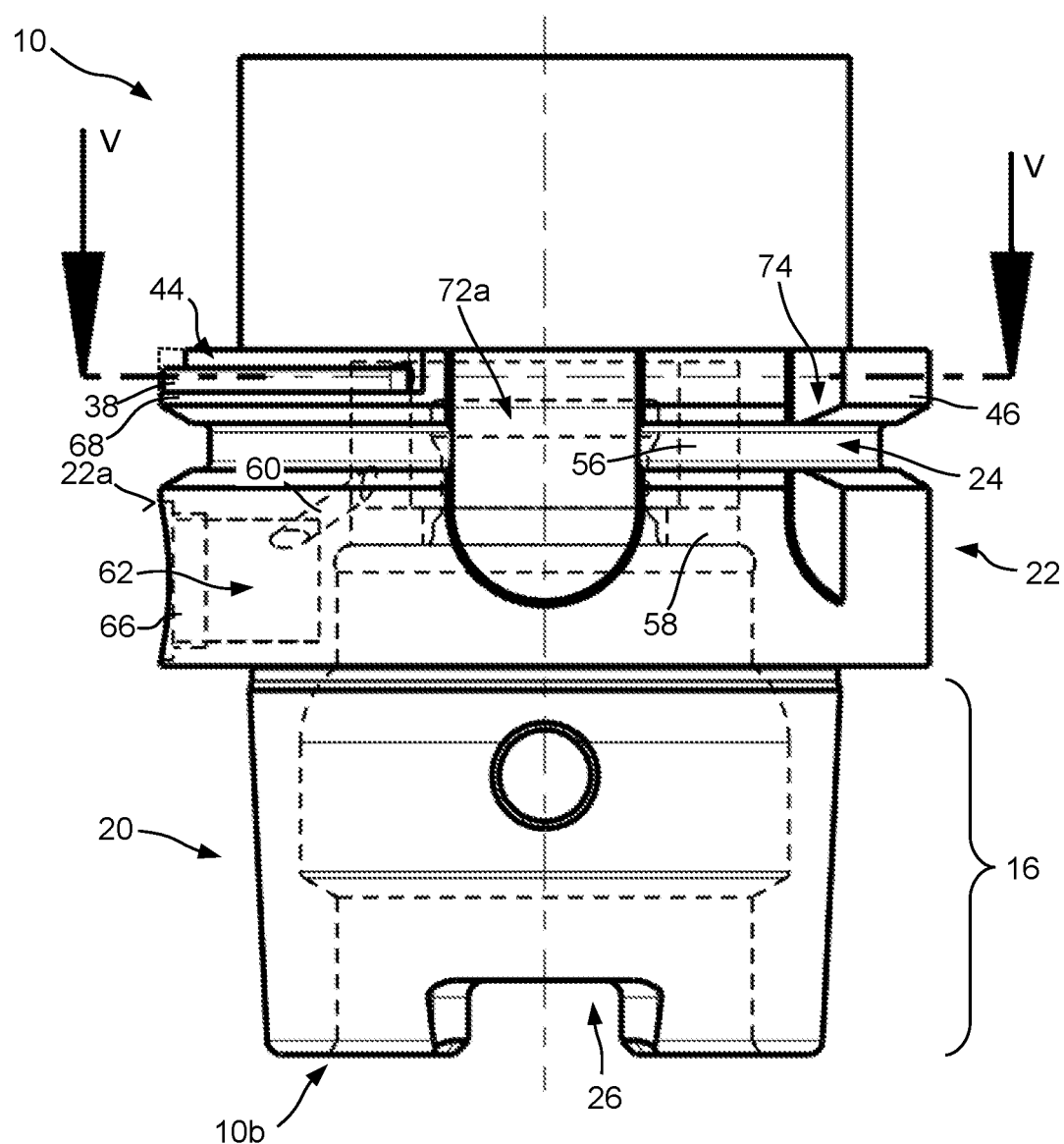
FIG. 4 is an elevation view of the coupling segment and of the handling segment of the tool holder according to the first embodiment.
Figure 5:
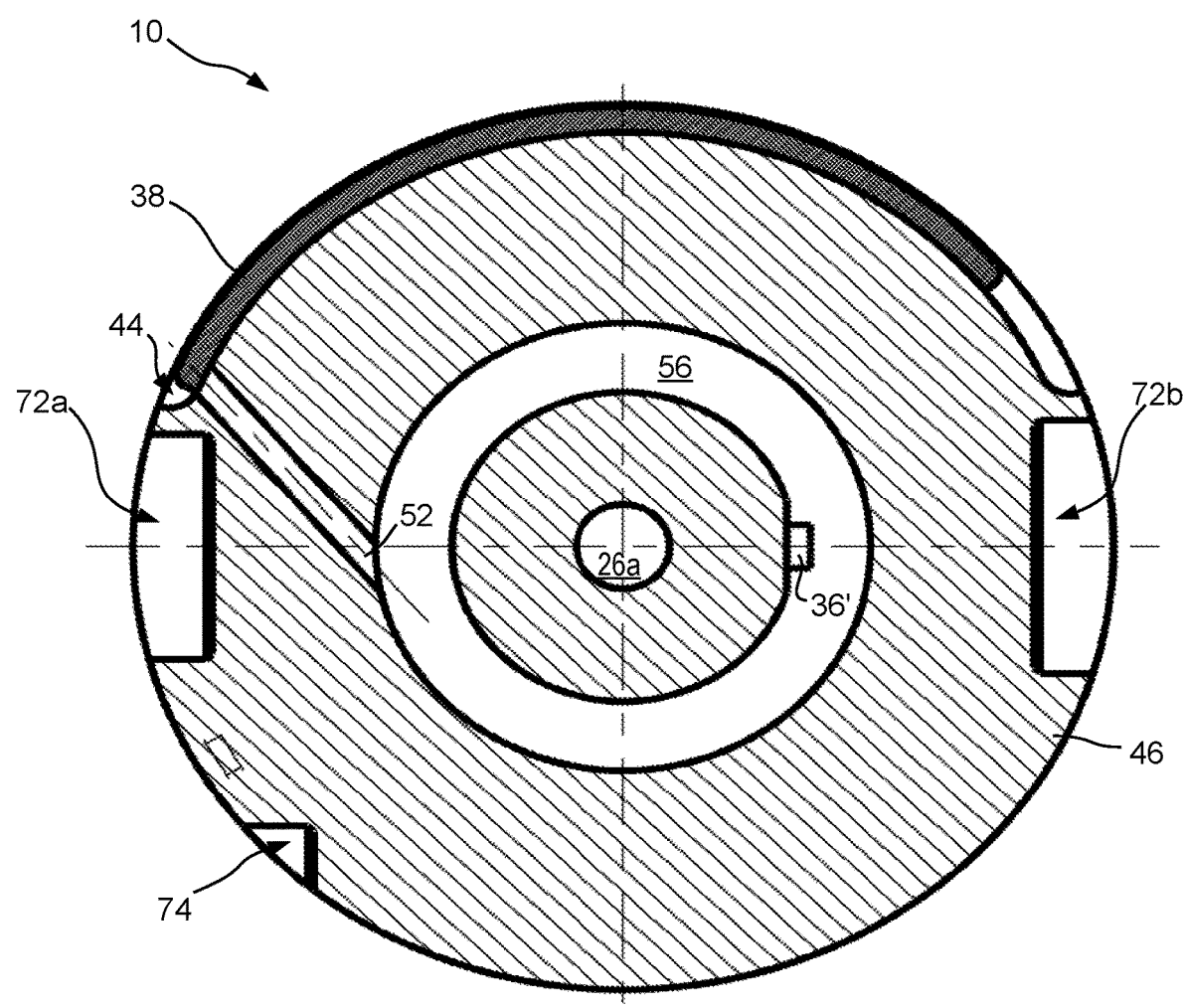
FIG. 5 is a cross-sectional view in the section plane V-V, orthogonal to the tool axis, of FIG. 4.
Figure 6:
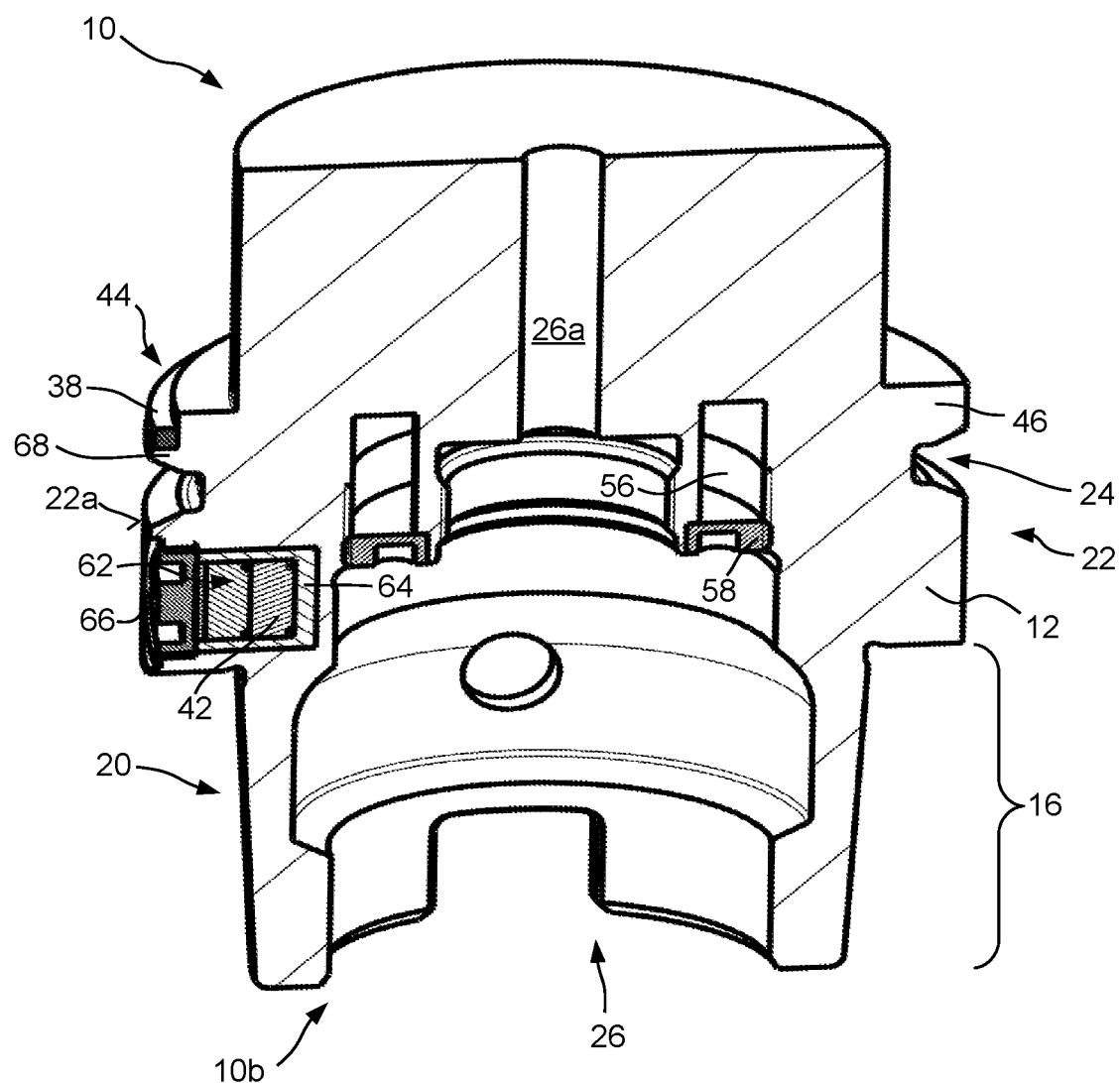
FIG. 6 is a perspective longitudinal section view of the tool holder segments of FIG. 4.

FIGS. 4 to 6 show tool holder 10 of the first embodiment in a variety of views. In order to simplify the depiction, the tool segment which is of no interest in FIGS. 4 to 6 is depicted merely as a cylinder. The cylinder can be imagined as being replaced by one of the tool-side conformations of FIGS. 1 to 3.

FIG. 4 is an elevation view of coupling segment 16 and of handling segment 22 of tool holder 10 in an unsectioned state, the internal conformation of tool holder 10 in the aforesaid segments 16 and 22 being depicted with dashed lines and in part labeled with reference characters.

FIG. 5 is a section view in the section plane V-V, orthogonal to tool axis D, of FIG. 4. FIG. 6 is a perspective longitudinal section through tool holder 10 depicted in simplified fashion in FIGS. 4 and 6.

FIGS. 4 to 6 firstly show how signal transfer apparatus 38 can extend along a significant portion of the circumference of tool holder 10. In the example depicted, signal transfer apparatus 38 extends over approximately 125°, i.e. somewhat more than one-third of the total circumference of radial projection 46 or of handling configuration 22. Depression 44 in which signal transfer apparatus 38 is received can extend over an even larger circumferential segment than signal transfer apparatus 38 received therein. For example, depression 44 can extend between two diametrically opposite axial grooves 72a and 72b that play a role in the handling of tool holder 10 by a gripper.

FIGS. 4 and 5 moreover show a further axial groove 74 that is embodied to be shorter in a circumferential direction than axial grooves 72a and 72b recited above. Axial groove 74 is used as an indexing groove 74 in the context of handling of tool holder 10 so that a defined orientation of tool holder 10 around its rotation axis D can be automatically detected. Axial grooves 72a and 72b have different dimensions in a circumferential direction. More precisely, axial groove 72a is embodied to be shorter in a circumferential direction than axial groove 72b located opposite it.

Axial grooves 72 and 74 intersect gripper channel 24.

Also apparent from FIG. 5 is the manner in which conductor conduit 52 that connects axial recess 56 to depression 44 is arranged tangentially with reference to axial recess 56. Undesired kinking of connecting conductors between the electrical circuit arranged in axial recess 56 and signal transfer apparatus 38 arranged in depression 44 is thereby very largely avoided. The tangential trajectory of conductor conduit 52 furthermore decreases the tensile force that acts on the connecting conductors upon rotation of tool holder 10 around its rotation axis D as a result of centrifugal force, since the centrifugal force is for the most part absorbed by the wall of conductor conduit 52. In order to simplify the depiction in FIG. 1, conductor conduit 52 is rotated into the section plane containing rotation axis D.

FIG. 5 furthermore depicts an alternative body sensor 36' arranged on the radially internal delimiting wall of axial recess 56. In FIG. 1 this sensor is located behind the section plane and is concealed by the component. Body sensor 36' is mounted on a flattened area of the substantially cylindrically shaped inner wall of recess 56, so as to ensure good contact between the sensor and the substrate.

For a description of FIG. 6, reference is made to the description above of FIG. 1.

Figure 7:
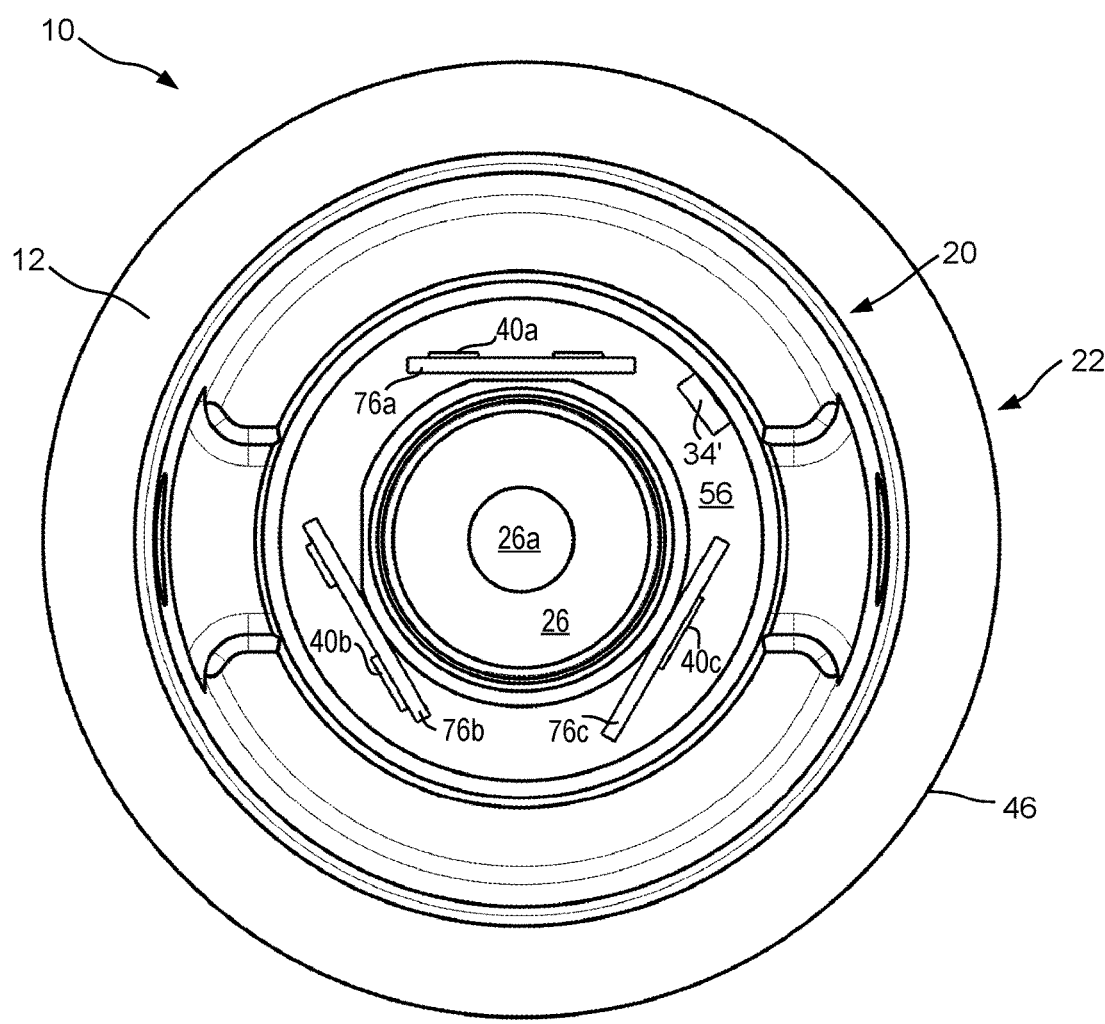
FIG. 7 is a bottom view of a tool holder of the first embodiment, looking along the tool holder rotation axis, having an electrical circuit embodied on three separate rigid circuit substrates.

FIG. 7 is a bottom view of tool holder 10 of FIGS. 1 and 4 to 6 along rotation axis D. Threaded cover 58 is omitted in the interest of clarity. There is therefore a direct view into the annular axial recess 56.

Tool holder 10 of FIG. 7 comprises an alternative embodiment of electrical circuit 40. The latter is implemented in three sub-circuits 40a to 40c, embodied separately from one another but connected to one another in signal-transferring fashion. Each sub-circuit 40a to 40c is embodied on a separate rigid circuit substrate 76a, 76, and 76c. Rigid circuit substrates 76a, 76b, and 76c are arranged with a distribution around rotation axis D such that an inertial axis of the overall arrangement of rigid circuit substrates 76a, 76b, and 76c, having sub-circuits 40a to 40c embodied thereon, substantially coincides with rotation axis D. This minimizes an imbalance produced by the arrangement of rigid circuit substrates 76a, 76b, and 76c.

In the example depicted, rigid circuit substrates 76a, 76b, and 76c are arranged substantially parallel to rotation axis D and approximately equidistantly with a spacing from one another in a circumferential direction around rotation axis D.

Figure 8:
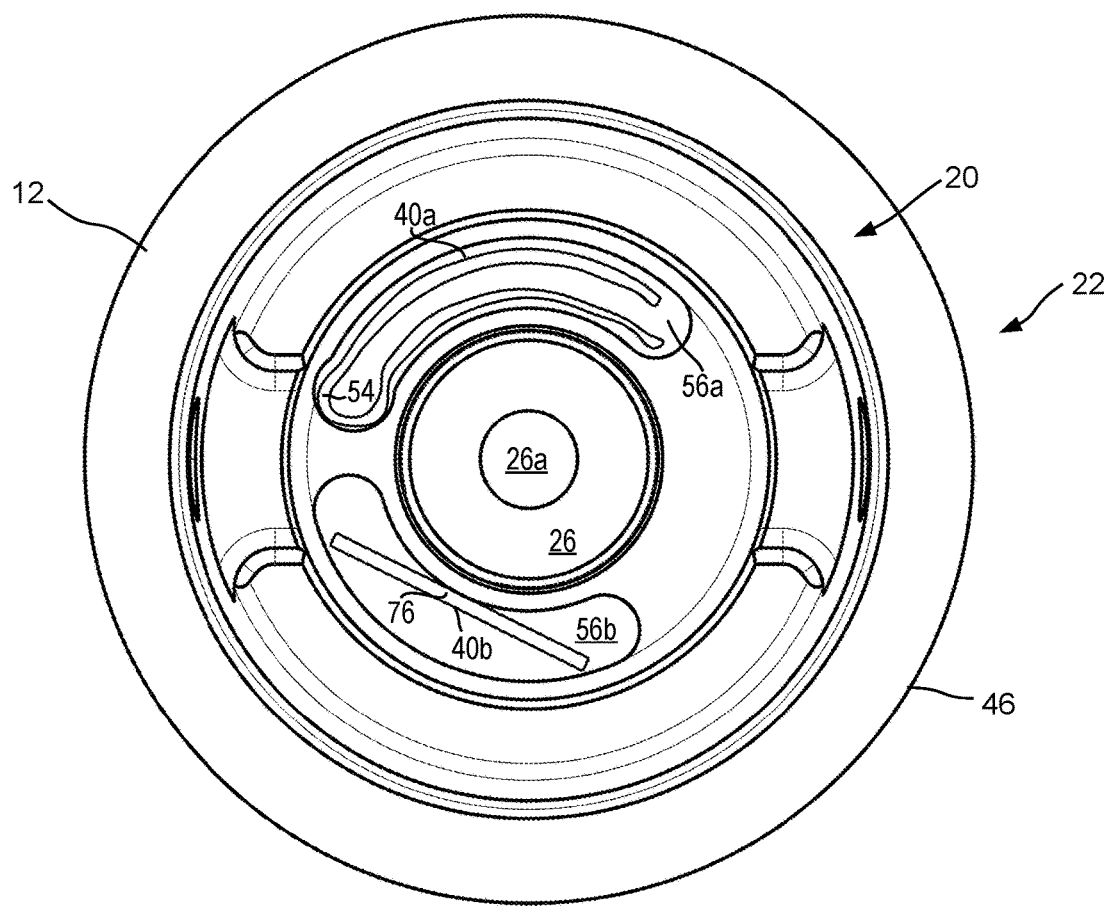
FIG. 8 is a view, corresponding to the perspective of FIG. 7, of the tool holder of the first embodiment having an alternative configuration of the electrical circuit implemented on a flexible and a rigid circuit substrate.

FIG. 8 shows a further alternative embodiment of axial recess 56 and of the electrical circuit provided therein.

The electrical circuit is in turn implemented in a manner split between two sub-circuits 40a and 40b, which are arranged on separate circuit substrates and are connected to one another in signal-transferring fashion.

Sub-circuit 40a is embodied on a flexible circuit substrate 54, whereas sub-circuit 40b is embodied on a rigid circuit substrate 76. In the example shown in FIG. 8, a separate axial sub-recess 56a and 56b is provided for each circuit substrate, exactly one circuit substrate being arranged in each sub-recess, namely circuit substrate 54 in sub-recess 56a and circuit substrate 76 in sub-recess 56b. Sub-recesses 56a and 56b extend in an axial direction, and partially cylindrically around a rotation axis D and around a circumferential segment of main body 12. In this exemplifying embodiment, circuit 40a is laid into sub-recess 56a in two-ply fashion. The circuit can, however, likewise be laid into sub-recess 56a in one ply, or with more than two plies. To ensure that the flexible but only limitedly deformable circuit substrate 54 is not too severely kinked, sub-recess 56a possesses at its one end an enlargement in which circuit substrate 54 can be bent with a sufficiently large bending radius.

It is understood that tool holder 10 can possess any number of sub-recesses, all of which are populated with sub-circuits all comprising a rigid circuit substrate or all comprising a flexible circuit substrate, or with a mixture of rigid and flexible circuit substrates. In order to avoid or at least reduce undesired imbalances, sub-recesses of axial recess 56 are preferably embodied identically and are arranged symmetrically around rotation axis D. In this case sub-recesses 56a and 56b would be embodied with the same axial depth and the same dimension in a circumferential direction, and would be arranged diametrically opposite one another.

Rigid circuit substrates 76 or sub-circuit substrates 76a, 76b, and 76c are also preferably immobilized in their respective recesses in which they are arranged, for example by adhesive bonding.

Figure 9:
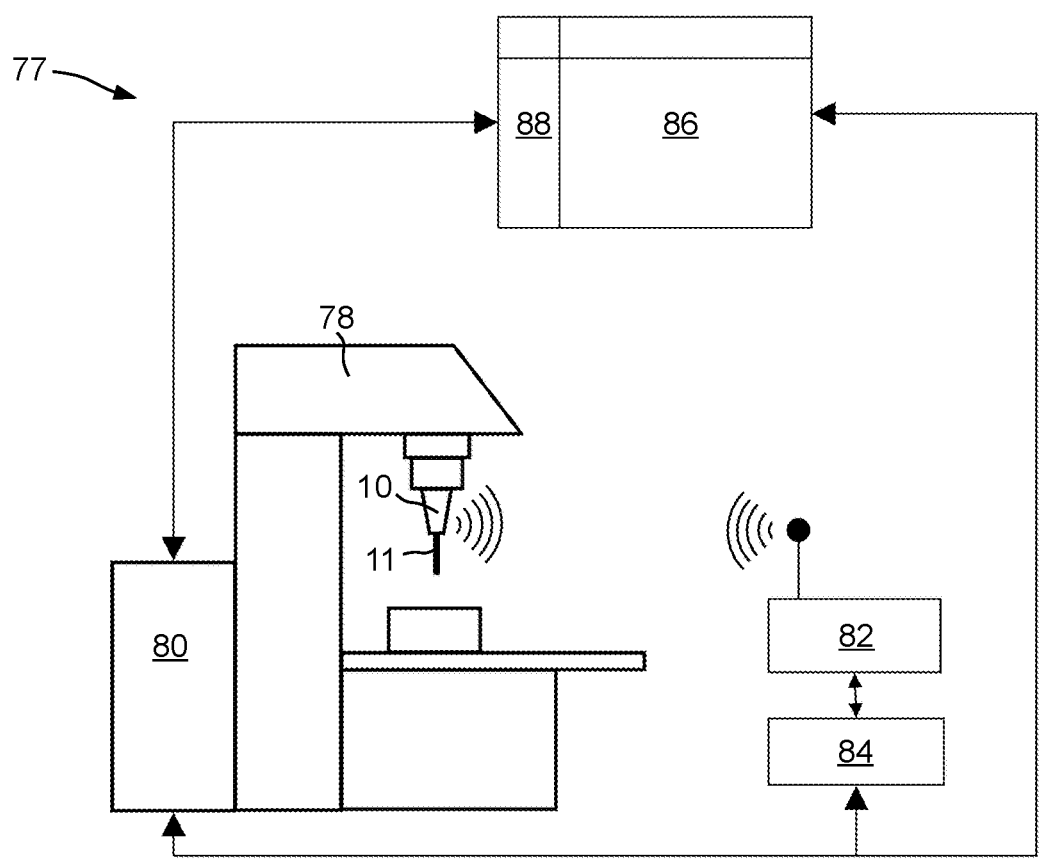
FIG. 9 is a schematic depiction of an apparatus arrangement according to the present invention which uses at least one tool holder according to the present invention.

FIG. 9 depicts by way of example an apparatus arrangement 77 that utilizes the previously described tool holder 10 according to the present invention (and also the alternative tool holders 110 and 210).

Apparatus arrangement 77 encompasses a machine tool 78, for example a multi-axis drilling and milling machine 78, in which tool holder 10, having a tool 11 for material-removing machining clamped therein, is received. Machine tool 78 comprises in known fashion a machine controller 80 that enables control of the position and speed of the tool center point (TCP) of tool 11.

Apparatus arrangement 77 furthermore encompasses a receiving device 82 that is embodied for signal transfer with signal transfer apparatus 38. Receiving device 82 is preferably embodied as a transmitting/receiving device 82 for bidirectional signal transfer with signal transfer apparatus 38.

An evaluation apparatus 84 connected in data-transferring fashion to receiving device 82 can be provided, said apparatus processing the data received by receiving device 82 from signal transfer apparatus 38 of tool holder 10. Evaluation apparatus 84 can have for that purpose a memory in which data and programs are stored.

To allow control actions to be applied to machine tool 78 on the basis of the data sensed by the sensors of tool holder 10 after said data are processed by evaluation apparatus 84, machine controller 80 is advantageously connected in data-transferring fashion to evaluation apparatus 84.

Apparatus arrangement 77 can furthermore comprise a tool storage system 86 having a tool storage system manager 88. Tool storage system 86, together with tool storage system manager 88, can be connected both to machine controller 80 and to evaluation apparatus 84 so that the data sensed by the sensors of tool holder 10 are also usable in tool storage system manager 88. For example, when it is inferred, based on the variables sensed by the sensors of tool holder 10, that a wear limit of tool 11 has been reached, an equivalent replacement tool 11' is made ready in tool storage system 11 and clamped in machine tool 78 in place of the worn tool 11.

In principle, processing of the sensed signals of the sensors can already be accomplished by the previously described electrical circuit 40 in the tool holder. With an external evaluation apparatus 84 outside tool holder 10, however, on the one hand a substantially greater data processing capacity can be furnished, and on the other hand the size of electrical circuit 40 in the tool holder can be reduced.

The invention claimed is:

1. A tool holder which is embodied for rotation around a tool holder rotation axis defining an axial direction, comprising:

at one axial longitudinal end, a tool segment having a tool receiving configuration for receiving a tool;

at another axial longitudinal end, a coupling segment having a coupling configuration for torque-transferring coupling to a machine spindle of a machine tool;

a measurement apparatus for sensing data relating to the operation of the tool holder being provided on the tool holder, said measurement apparatus comprising:

at least one sensor supplying a sensed signal, a signal transfer apparatus for transferring a measured signal from the measurement apparatus to a receiving apparatus embodied separately from the tool holder and arranged remotely from it, an electrical circuit, connected in signal-transferring fashion to the sensor and to the signal transfer apparatus, for at least one of (a) applying control to the sensor, (b) processing the sensed signal of the sensor, and (c) applying control to the signal transfer apparatus, and an energy supply apparatus that is connected in energy-transferring fashion to the signal transfer apparatus and to the electrical circuit; and a tool holder main body that comprises at least one of the tool segment and the coupling segment, at least one component from among the sensor, electrical circuit, and energy supply apparatus being received in a recess in the interior of the tool holder main body;

wherein at least the sensor constituting a tool segment sensor is arranged in the tool segment of the tool holder main body, wherein the at least one sensor is arranged between a radially internal wall of a tool receiving recess of the tool receiving configuration and a radially external outer wall of the tool holder main body.

2. The tool holder, having a measurement apparatus, according to claim 1, wherein the tool holder is embodied in one piece and comprises both the tool segment and the coupling segment.

3. The tool holder, having a measurement apparatus, according to claim 1, wherein the tool holder, having a measurement apparatus, has the same external contour when viewed orthogonally to the tool holder rotation axis in at least two different viewing directions that are rotated 90° with respect to one another around the tool holder rotation axis, as a tool holder functionally identical in terms of material removal technology and having no measurement apparatus.

4. The tool holder, having a measurement apparatus, according to claim 1, wherein the tool holder main body comprises an axial recess in which the electrical circuit is received.

5. The tool holder, having a measurement apparatus, according to claim 4, wherein the tool holder main body comprises at least two axial recesses, in each of which a component of the electrical circuit is received.

6. The tool holder, having a measurement apparatus, according to claim 4, wherein the electrical circuit encompasses several rigid circuit substrates, separate from one another and carrying conductor paths and electrical components.

7. The tool holder, having a measurement apparatus, according to claim 4, wherein the at least one axial recess is closable with a cover delimiting a receiving space.

8. The tool holder, having a measurement apparatus, according to claim 7, wherein the at least one tool segment sensor is at least one of a temperature sensor, a deformation sensor, an acceleration sensor and a pressure sensor.

9. The tool holder, having a measurement apparatus, according to claim 1, wherein the tool receiving configuration is one of a shrink chuck, a hydraulic expansion chuck, a cutting head receptacle, a clamping jaw chuck and a powered clamping chuck.

10. The tool holder, having a measurement apparatus, according to claim 1, wherein at least one sensor constituting a body sensor is arranged in an axial recess.

11. The tool holder, having a measurement apparatus, according to claim 1, wherein a plurality of identical sensors for sensing a first operating variable are arranged with a distribution in a circumferential direction around the tool holder rotation axis, the measurement apparatus further encompassing a signal evaluation apparatus that is embodied to infer indirectly, by comparing the sensed signals of the plurality of sensors, a second operating variable not directly sensed by the sensors.

12. The tool holder, having a measurement apparatus, according to claim 1, wherein the energy supply apparatus is an electrical energy reservoir.

13. The tool holder, having a measurement apparatus, according to claim 1, wherein the energy supply apparatus encompasses an induction apparatus embodied for inductive transfer of electrical energy.

14. The tool holder, having a measurement apparatus, according to claim 1, wherein the energy supply apparatus is received in a recess extending inward from an outer side of the tool holder main body.

15. The tool holder having a measurement apparatus, according to claim 14, wherein the recess extending radially inward is closable by a cover delimiting a receiving volume.

16. The tool holder, having a measurement apparatus, according to claim 1, wherein the signal transfer apparatus is arranged on the outer side of the tool holder main body.

17. The tool holder, having a measurement apparatus, according to claim 16, wherein the tool holder has on its outer side a gripper channel, extending in a circumferential direction around the tool holder rotation axis, which is embodied for positive engagement with a gripper device, the signal transfer apparatus being received in a depression axially adjacent to the gripper channel.

18. The tool holder, having a measurement apparatus, according to claim 17, wherein a radially projecting flange extending in a circumferential direction around the tool holder rotation axis, which flange separates the depression from the gripper channel, is provided axially between the gripper channel and the depression.

19. The tool holder, having a measurement apparatus, according to claim 16, wherein the tool holder comprises on its outer side two axial grooves provided in a circumferential direction with a spacing from one another, the signal transfer apparatus being received in a circumferential direction between the axial grooves.

20. The tool holder, having a measurement apparatus, according to claim 19, wherein the tool holder has on its outer side a gripper channel, extending in a circumferential direction around the tool holder rotation axis, which is embodied for positive engagement with a gripper device, at least one axial groove.

21. The tool holder, having a measurement apparatus, according to claim 1, wherein a conductor conduit for receiving at least one of a connecting conductor transferring a signal and energy between two components of the measurement apparatus encloses an angle with a radial line extending from the tool holder rotation axis.

22. The tool holder, having a measurement apparatus, according to claim 21, wherein the conductor conduit is placed in a plane orthogonal to the tool holder rotation axis.

23. The tool holder, having a measurement apparatus, according to claim 1, wherein the coupling configuration encompasses one of a hollow shank taper, a steep taper and an engagement configuration for a spherical clamping system.

24. A tool holder which is embodied for rotation around a tool holder rotation axis defining an axial direction, comprising:
- at one axial longitudinal end, a tool segment having a tool receiving configuration for receiving a tool;
- at another axial longitudinal end, a coupling segment having a coupling configuration for torque-transferring coupling to a machine spindle of a machine tool;
- a measurement apparatus for sensing data relating to the operation of the tool holder being provided on the tool holder, said measurement apparatus comprising:
  - at least one sensor supplying a sensed signal,
  - a signal transfer apparatus for transferring a measured signal from the measurement apparatus to a receiving apparatus embodied separately from the tool holder and arranged remotely from it,
  - an electrical circuit, connected in signal-transferring fashion to the sensor and to the signal transfer apparatus, for at least one of (a) applying control to the sensor, (b) processing the sensed signal of the sensor, and (c) applying control to the signal transfer apparatus, and
  - an energy supply apparatus that is connected in energy-transferring fashion to the signal transfer apparatus and to the electrical circuit; and
- a tool holder main body that comprises at least one of the tool segment and the coupling segment, at least one component from among the sensor, electrical circuit, and energy supply apparatus being received in a recess in the interior of the tool holder main body;
- wherein the tool receiving configuration is a hydraulic expansion chuck; and
- wherein a tool segment sensor is arranged in a wall of a pressure chamber of the hydraulic expansion chuck and is embodied for one of indirect and direct sensing of the clamping pressure in the pressure chamber.

25. A tool holder which is embodied for rotation around a tool holder rotation axis defining an axial direction, comprising:
- at one axial longitudinal end, a tool segment having a tool receiving configuration for receiving a tool;
- at another axial longitudinal end, a coupling segment having a coupling configuration for torque-transferring coupling to a machine spindle of a machine tool;
- a measurement apparatus for sensing data relating to the operation of the tool holder being provided on the tool holder, said measurement apparatus comprising:
  - at least one sensor supplying a sensed signal,
  - a signal transfer apparatus for transferring a measured signal from the measurement apparatus to a receiving apparatus embodied separately from the tool holder and arranged remotely from it,
  - an electrical circuit, connected in signal-transferring fashion to the sensor and to the signal transfer apparatus, for at least one of (a) applying control to the sensor,
  - (b) processing the sensed signal of the sensor, and (c) applying control to the signal transfer apparatus, and
  - an energy supply apparatus that is connected in energy-transferring fashion to the signal transfer apparatus and to the electrical circuit;
- a tool holder main body that comprises at least one of the tool segment and the coupling segment, at least one component from among the sensor, electrical circuit, and energy supply apparatus being received in a recess in the interior of the tool holder main body;
- wherein at least one sensor constituting a coolant sensor is arranged in a coolant conduit, said conduit for conveying at least one of a coolant and a lubricant.

26. An apparatus arrangement for machining workpieces, comprising:
- at least one tool holder according to one of claims 1, 24 and 25,
- a machine tool having a machine spindle that is embodied for coupling to the at least one tool holder, and
- a receiving device that is embodied to receive the measured signals transferred from the signal transfer apparatus.

27. The apparatus arrangement according to claim 26, wherein the receiving device is embodied as a transmitting/receiving device for bidirectional signal transfer.

28. The apparatus arrangement according to claim 26, wherein it comprises an evaluation apparatus, connected in data-transferring fashion to the receiving device, which is embodied to perform at least one of processing and evaluating the measured signals transferred from the signal transfer apparatus.

29. The apparatus arrangement according to claim 26, wherein the machine tool encompasses a machine controller that controls drive systems of the machine tool for workpiece machining and that is connected in data-transferring fashion to at least one of the evaluation apparatus and to the receiving device.

30. The apparatus arrangement according to claim 26, further comprising a tool storage system having a tool manager, the tool manager being connected in data-transferring fashion to at least one of the receiving device, the evaluation apparatus and the machine controller.

* * * * *